(12) United States Patent
Bromley

(10) Patent No.: US 9,896,348 B2
(45) Date of Patent: Feb. 20, 2018

(54) NANOFLOTATION

(71) Applicant: David Bromley, West Vancouver (CA)

(72) Inventor: David Bromley, West Vancouver (CA)

(73) Assignee: 643096 Alberta Limited, West Vancouver, British Columbia (CA)

( * ) Notice: Subject to any disclaimer, the term of this patent is extended or adjusted under 35 U.S.C. 154(b) by 0 days.

(21) Appl. No.: 13/646,637

(22) Filed: Oct. 5, 2012

(65) Prior Publication Data

US 2013/0270191 A1    Oct. 17, 2013

Related U.S. Application Data

(63) Continuation of application No. PCT/CA2010/000520, filed on Apr. 9, 2010.

(51) Int. Cl.
C02F 1/44        (2006.01)
C02F 1/24        (2006.01)
(Continued)

(52) U.S. Cl.
CPC .............. *C02F 1/24* (2013.01); *B01D 61/18* (2013.01); *B01D 61/20* (2013.01); *B01D 63/02* (2013.01); *B01D 63/024* (2013.01); *B01D 63/08* (2013.01); *B01D 69/08* (2013.01); *B03D 1/1462* (2013.01); *B03D 1/1468* (2013.01); *B03D 1/1475* (2013.01); *B03D 1/1481* (2013.01);
(Continued)

(58) Field of Classification Search
USPC .... 210/151, 321.63, 321.64, 321.69, 321.75, 210/321.81, 321.84, 321.89, 321.9, 332, 210/333.01, 346, 353, 354, 407, 408, 410, 210/411, 486, 636, 500.23, 257.2
See application file for complete search history.

(56) References Cited

U.S. PATENT DOCUMENTS 3,674,686 A * 7/1972 Brimmer ................ B01J 47/133
                                                    210/685
3,968,036 A    7/1976 Liles et al.
(Continued)

FOREIGN PATENT DOCUMENTS

JP    07-328624    * 12/1995
JP    09-024250    *  1/1997
(Continued)

OTHER PUBLICATIONS

English language machine translation of JP 07-328624.*
(Continued)

*Primary Examiner* — Pranav N Patel
(74) *Attorney, Agent, or Firm* — Todd A. Rattray; Oyen Wiggs Green & Mutala LLP

(57) ABSTRACT

A nanoflotation system used to separate suspended solids or large settling or floating solids from water, waste water or liquids. This is accomplished through the use of submerged membranes, in combination with a number of design components comprising froth flotation, gravity settling, pre coating of the submerged membranes, spacing, of the membranes to facilitate flotation of solids to the surface or to the bottom of the containment chamber holding the submerged membranes, and membrane structures which use large diameter hollow fiber or tubular membranes and/or large pore opening membrane materials.

30 Claims, 7 Drawing Sheets

(51) Int. Cl.
*B01D 61/18* (2006.01)
*B01D 61/20* (2006.01)
*B01D 63/02* (2006.01)
*B01D 63/08* (2006.01)
*B01D 69/08* (2006.01)
*B03D 1/14* (2006.01)
*B03D 1/24* (2006.01)

(52) U.S. Cl.
CPC ............... *B03D 1/247* (2013.01); *C02F 1/44* (2013.01); *C02F 1/442* (2013.01); *B01D 2311/26* (2013.01); *B01D 2313/08* (2013.01); *B01D 2313/26* (2013.01); *B01D 2315/06* (2013.01); *B01D 2315/18* (2013.01); *C02F 2303/16* (2013.01); *C02F 2303/20* (2013.01)

(56) References Cited

U.S. PATENT DOCUMENTS

| | | | |
|---|---|---|---|
| 3,996,131 | A | 12/1976 | Conn |
| 4,289,626 | A | 9/1981 | Knopp et al. |
| 4,594,158 | A | 6/1986 | Chong et al. |
| 4,610,792 | A | 9/1986 | Van Gils et al. |
| 5,198,116 | A | 3/1993 | Comstock et al. |
| 5,632,890 | A | 5/1997 | Sugimoto |
| 6,461,524 | B1 | 10/2002 | Tsuihiji et al. |
| 6,511,602 | B1 * | 1/2003 | Miyashita ............... B01D 61/18 210/321.69 |
| 6,645,380 | B2 | 11/2003 | Baig et al. |
| 7,279,215 | B2 | 10/2007 | Hester et al. |
| 8,685,252 | B2 | 4/2014 | Vuong |
| 2002/0038782 | A1 | 4/2002 | Kim et al. |
| 2002/0134724 | A1 | 9/2002 | Heine et al. |
| 2003/0136746 | A1 * | 7/2003 | Behmann ............... B01D 61/18 210/771 |
| 2004/0159609 | A1 | 8/2004 | Chase |
| 2004/0217058 | A1 | 11/2004 | Cadera et al. |
| 2005/0218074 | A1 | 10/2005 | Pollock |
| 2005/0242041 | A1 * | 11/2005 | Cumberland ................ 210/660 |
| 2006/0102562 | A1 * | 5/2006 | Cannon et al. .............. 210/681 |
| 2008/0190849 | A1 | 8/2008 | Vuong |
| 2008/0314833 | A1 * | 12/2008 | Mosqueda-Jimenez et al. ........................... 210/636 |
| 2009/0236280 | A1 * | 9/2009 | Morita et al. ............ 210/321.69 |
| 2010/0264084 | A1 * | 10/2010 | Midorikawa et al. ........ 210/631 |
| 2011/0247978 | A1 * | 10/2011 | Conner ......................... 210/615 |
| 2014/0131273 | A1 | 5/2014 | Murthy et al. |

FOREIGN PATENT DOCUMENTS

| | | | |
|---|---|---|---|
| JP | 11-342321 | * | 12/1999 |
| JP | 2004130197 | | 4/2004 |
| JP | 2005118608 | | 5/2005 |
| WO | WO2006134915 | * | 12/2006 |
| WO | WO2009085252 | * | 7/2009 |

OTHER PUBLICATIONS

English language machine translation of JP 09-024250.*
English language machine tranlation of JP 11-342321.*
Huan-jung Fan, Tachung Wang, P. R. Anderson; Removal of Cu(II) by Iron Oxide-Coated Granular Actiavated Carbon; Journal of the Chinese Institute of Environmental Engineering, vol. 10, 2000, pp. 193-199.*
Kenji Okada, Yasuharu Akagi, Masahiko Kogure and Naoya Yoshioka, Effect on Surface Charges of Bubbles and Fine Particles on Air Flotation Process; The Canadian Journal of Chemical Engineering, vol. 68. Jun. 1990; pp. 393-399.*
S. Laborie, C. Cabassud, U Durand-Bourli, J.M. Lain; Fouling control by air sparging inside hollow fibre membranes effects on energy consumption; Desalination 1 lg (1998) 189-196.*
Mick Bjelopavlic, Gayle Newcombe, and Rob Hayes; Adsorption of NOM onto Activated Carbon: Effect of Surface Charge, Ionic Strength, and Pore Volume Distribution; Journal of Colloid and Interface Science 210, 271-280 (1999).*
C. Akmil Basar, A. Karagunduz, B. Keskinler, A. Cakici, Effect of presence of ions on surface characteristics of surfactant modified powdered activated carbon (PAC), Applied Surface Science 218 (2003) 169-174.*
Jae-Woon Shim , Soo-Jin Park , Seung-Kon Ryu,Effect of modification with HNO3 and NaOH on metal adsorption by pitch-based activated carbon fibers, Carbon 39 (2001) 1635-1642.*
Hyun-Doc Choi, Woo-Sung Jung, Jung-Min Cho, Byung-Gon Ryu, Jung-Seok Yang, Kitae Baek, Adsorption of Cr(VI) onto cationic surfactant-modified activated carbon, Journal of Hazardous Materials 166 (2009) 642-646.*
Hye-Jin Hong, Hojeong Kim, You-Jin Lee, Ji-Won Yang, Removal of anionic contaminants by surfactant modified powdered activated carbon (SM-PAC) combined with ultrafiltration, Journal of Hazardous Materials 170 (2009) 1242-1246.*
Chi K. Ahn, Donghee Park, Seung H.Woo,* , Jong M. Park, Removal of cationic heavy metal from aqueous solution by activated carbon impregnated with anionic surfactants, Journal of Hazardous Materials 164 (2009) 1130-1136.*
S. Vigneswaran, W.S. Guo, P. Smith, H.H. Ngo, Submerged membrane adsorption hybrid system (SMAHS): process control and optimization of operating parameters, Desalination, vol. 202, Issues 1-3, Jan. 5, 2007, pp. 392-399.*
Han-Seung Kim, Satoshi Takizawa, Shinichiro Ohgaki, Application of microfiltration systems coupled with powdered activated carbon to river water treatment, Desalination, vol. 202, Issues 1-3, Jan. 5, 2007, pp. 271-277.*

* cited by examiner

TYPICAL HOLLOW FIBRE MEMBRANE PATTERN FOR EACH HOLLOW FIBRE MEMBRANE BUNDLE

NANOFLOTATION

RELATED APPLICATIONS

This application is a continuation of PCT application No. PCT/CA2010/000520 which was filed on 9 Apr. 2010 and which is hereby incorporated herein by reference.

TECHNICAL FIELD

The invention relates to water and waste water treatment, solid and liquid recovery.

BACKGROUND

Submerged membranes have been applied with variable success. One of the key problems is membrane fouling and membrane maintenance. Numerous inventions have used air to reduce the membrane fouling. In addition there are the traditional methods of solid separation in a liquid. Such traditional methods use clarifiers with and without settling tubes or inclined settling plates, or air flotation systems, where high pressure dissolved air, or induced air or froth flotation systems are used to separate the solids and float the solids to the surface and then remove the solid sludge/skim layer with a skimmer or skim/float separation system.

U.S. Pat. No. 7,160,454 B2 is an invention that uses air and small pore, small diameter submerged membranes. Patent Application US 2007/0205146 A1 has provided an application on the design and assembly of a submerged membrane for use with invention U.S. Pat. No. 7,160,454 B2.

Patent Application US 2004/0217058 A1 uses the combination of dissolved air flotation and submerged membranes where different zones make up the operation of the invention application.

U.S. Pat. No. 6,344,147 B1 is an invention using perforated membranes in the bottom of a flotation tank to create small air bubbles to float solids to the surface in a flotation water or wastewater treatment system.

Journal papers authored by Lazaridis et al (Aristotle University, Greece) in July 2003 and July 2004, discuss the benefits of froth flotation with submerged membranes but do not discuss the effects of the use of coarse membranes and the spacing and precoating of membranes in connection with froth flotation.

Journal papers authored by Benjamin et al (Washington State University) in 2008 talk about the benefit of precoats on membranes for organic removal and membrane maintenance.

SUMMARY OF INVENTION

Aspects of the invention provide methods and systems for treatment of liquids which use a precoat of nano particles on coarse (large pore and large diameter) submerged membranes and the use of froth flotation and membrane spacing to both improve flux through the submerged membrane and maintenance of (e.g. removal of solids from) the membrane surface. The particles of the precoat media may have electronic charge.

The invention recognizes:
1. The benefit of matching the design of water and waste water air flotation tanks and typical clarification cells in combination with the hydraulics of submerged membranes in those same tanks and cells.
2. The benefit of maintaining a hydraulic flux rate through the membranes to match the hydraulics of flotation and settling vectors in the tank or cell.
3. The benefit of allowing the membranes to be back-washed and cleaned without removing the membranes for each cleaning from the tank or cell.
4. The benefit of a precoat on the membranes to improve flux rates and the maintenance of the membrane surface as well as provide high levels of nano particle removal using a coarse and large diameter membrane system.
5. The benefit of membrane spacing to optimize hydraulic velocity vectors to facilitate the use of flotation to float solids and gravity to settle solids.
6. The benefit of froth flotation to extend the cycle time for submerged membranes and remove and replace the precoats on the membrane surfaces.

Embodiments of the invention use a combination of froth flotation and clarification with submerged membranes in one cell or tank.

One aspect of the invention provides a system for liquid treatment comprising: a membrane screen submerged in a liquid to be treated; and a charged granular precoat media introduced into the liquid and drawn to a surface of the membrane screen by a pressure differential; wherein the liquid is drawn through the membrane screen and through the precoat media on the surface thereof by the pressure differential, whereby the precoat media removes solids from the liquid.

Another aspect of the invention provides a system for liquid filtration comprising: a membrane screen for submerging in a liquid to be treated; a vacuum pump coupled in fluid communication with a downstream side of the membrane screen for creating a pressure differential; and a charged granular precoat media for introduction into the liquid; wherein the pressure differential created by the vacuum pump draws the precoat media to a surface of the membrane screen; and whereby the precoat media removes solids from the liquid.

Another aspect of the invention provides a system for liquid filtration comprising: a tank; a plurality of membrane modules located within the tank and to be submerged in a liquid to be treated, wherein at least two adjacent membrane modules are spaced apart by at least 100 mm, each membrane module comprising a plurality of membrane screens spaced apart by at least 12 mm, each membrane screen comprising: a hollow tube having a diameter of greater than 5 mm; a pore size of 1 micron or greater; and a sealed end; a vacuum pump coupled in fluid communication with the tank and at least one of the membrane screens to create a pressure differential and to remove a treated liquid from the tank; a charged granular precoat media to be introduced into the tank and to be drawn to a surface of the membrane screens by the pressure differential, whereby the precoat media removes solids from the liquid; a froth generator coupled in fluid communication with the tank for creating a froth to be introduced into the tank; and a backwash pump coupled in fluid communication with the tank for pumping a backwash liquid into the tank and into the hollow tubes of the membrane screens for removing the charged granular precoat media from the surface of the membrane screens.

Another aspect of the invention provides a kit for liquid filtration comprising: a liquid filtration system comprising: a tank; a plurality of membrane screens for installation in the tank, each membrane screen comprising a hollow tube having a diameter of greater than 5 mm, a pore size of 1 micron or greater, and a sealed end; a vacuum pump coupled in fluid communication with at least one of the membrane screens to create a pressure differential and for removing a treated liquid from the tank; a backwash pump coupled in fluid communication with at least one of the membrane screens for pumping a backwash liquid into the hollow tubes of the membrane screens; and a froth generator fluidly coupled to the tank for injecting a froth into the tank; and a charged granular precoat media for introduction into the tank and to be drawn to a surface of the membrane screens by the pressure differential, whereby the precoat media removes solids from the liquid.

Another aspect of the invention provides a method of liquid filtration, the method comprising: (a) introducing charged granular precoat media into a liquid to be treated; (b) drawing the charged granular precoat media to a surface of a membrane screen by way of a pressure differential; and (c) filtering the liquid to be treated through the charged granular precoat media on the surface of the membrane screen, whereby the precoat media removes solids from the liquid.

The method may further comprise (d) removing the charged granular precoat media from the surface of the membrane screen by way of an opposed pressure differential opposed to the pressure differential. The method may further comprise (e) creating a froth and introducing the froth into the liquid to be treated. Introducing the froth may comprise creating a crossflow from the flow created by the pressure differential at the surface of the membrane screen to reduce clogging and buildup of solids at the surface of the charged granular media. The membrane screen may comprise a hollow tube and the pressure differential may cause the liquid to flow from an exterior of the hollow tube into an interior bore of the hollow tube. The membrane screen may comprise a hollow tube and removing the precoat media from the surface of the membrane may comprise causing the liquid to flow from an interior bore of the hollow tube to an exterior of the hollow tube.

The method may further comprise (f) removing at least some of the precoat media from the membrane screen by way of the froth. The froth may comprise one of a cationic and an anionic surfactant for creating a charged air bubble in the froth. The froth may comprise a non-ionic surfactant. Introducing the froth may comprise introducing the froth by way of the opposed pressure differential. Filtering the liquid may comprises surface-attaching particles in the liquid to a surface of the charged granular precoat media. Filtering the liquid may comprise entrapping particles in the liquid between granules of the charged granular precoat media. Filtering the liquid may comprise surface attaching particles in the liquid to be treated to a surface of the charged granular precoat media and entrapping the particles between granules of the charged granular precoat media.

The method may involve repeating steps (a) through (c). The method may involve repeating steps (a) through (d) in an order a, b, e, c, d. The method may involve repeating steps (a) through (e) in an order a, b, e, c, d, e.

Note: All dimensions shown are in millimeters and are typical. Dimensions may vary.

DESCRIPTION

Figure 7:
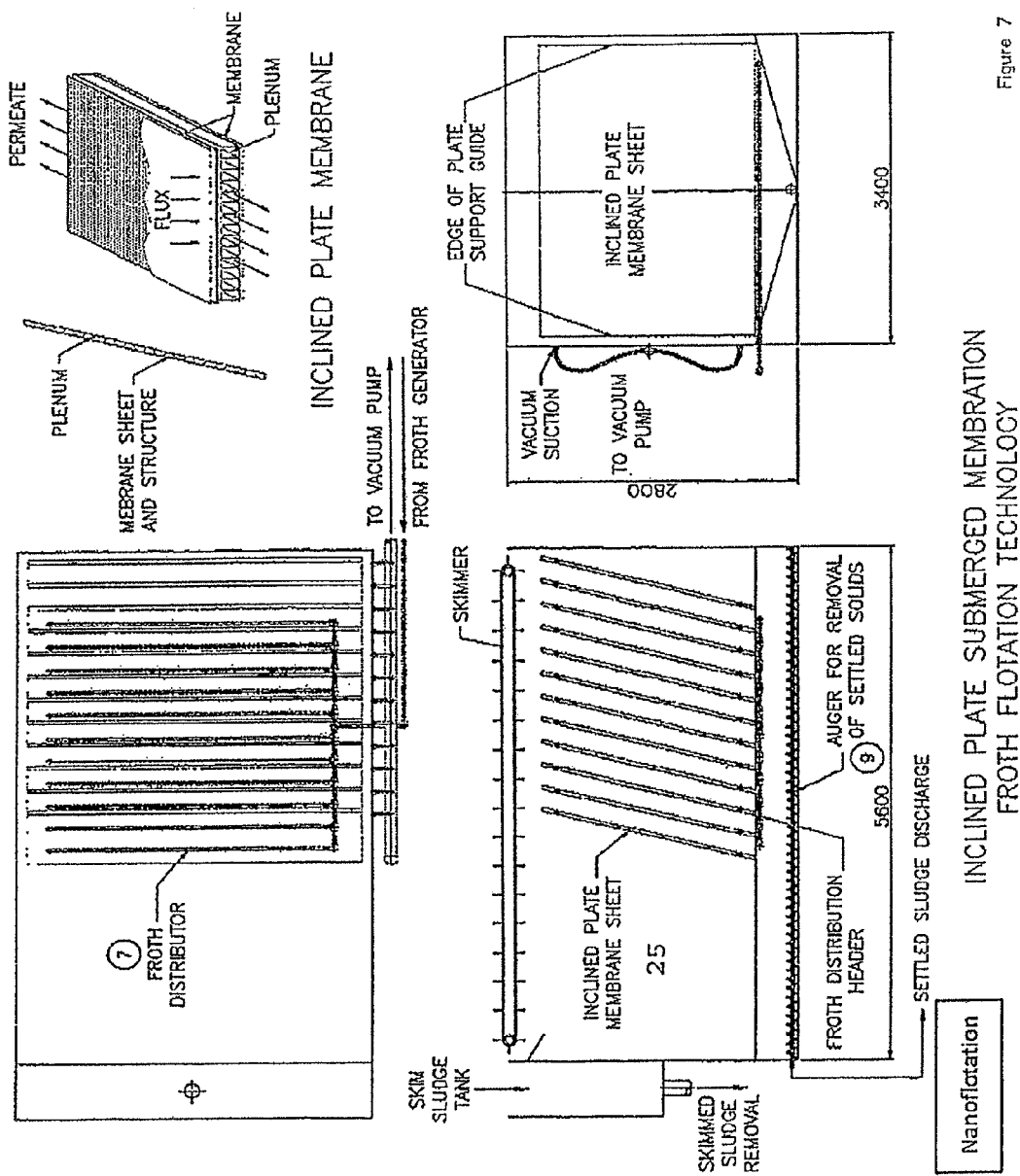
FIG. 7 shows a typical design of an embodiment of the invention where the membranes are flat sheet membranes instead of hollow fibre membranes.

Raw water or waste water or any liquid 1 requiring solid separation is conveyed to a flotation tank or cell which has an area on the bottom 9 for settled solids and an area on the top to collect flotation solids or skim layer or float layer 10 with a method to remove solids from both the top and the bottom. The flotation tank/cell will contain submerged membranes 11, 23, 25. In some embodiments, submerged membranes are provided in membrane bundles 11, each of which comprises a plurality of individual tubular-shaped membranes 23 (see FIGS. 1-6). In other embodiments, submerged membranes are provided in the form of generally flat sheets 25 (see FIG. 7). Sludge is removed from the flotation tank/cell via the bottom of the tank/cell and/or the skim collection tank 8. Water or waste water or any liquid with solids 1 that enters the flotation cell/tank has froth 3 added to the water or waste water or liquid with the solids 1. The froth is produced from a typical froth generator 4. The froth is created by the use of a surfactant or similar agent that creates froth 5. Froth is also added in between the membrane fibres 23 or flat sheets 25 during the normal filtration operation of the flotation tank/cell. The submerged membranes 11, 23, 25, have clean water sucked through the membrane under vacuum from a typical vacuum membrane pump 12. Clean water 14 is then produced. Rejected solids either float to the surface with the benefit of the fine bubbles from the froth which can have an electron charge on the surface of the bubbles which aids in the attachment of the bubble to the solid and then floats to the surface.

Prior to actual filtration and after backwashing of the membranes, the membrane surface is precoated with either 1. a precoat particle 6 such as powder activated carbon, or a metal oxide or any precoat particle 6 that is considered beneficial in the protection of the membranes, maintenance of the membranes, and/or removal of solids
2. or a precoat particle from the existing particles in the flotation tank/cell that may have resulted from the water or waste water or any liquid to be treated, 1.

The precoat particles, 6, which may be electronically charged, may be added with the froth generator and introduced 7 into the flotation tank/cell via the perforated pipes, 15, in the base of the membrane module. Precoat can be added in stages prior to backwash.

After filtration, pressure loss across the membrane reaches a specified level, the membranes are backwashed, 13 using either a froth or air or water or all three mediums in combination with each other. Backwash water is added to the base of the membrane module into the cavity of the membrane module base, 24. With the back wash most of the precoat particles will be removed allowing more precoat to be added. The precoat particles removed will either settle or float to the surface of the flotation tank/cell. To aid in the addition of the precoat there may be a desire to recycle the clean water, 14, back into the flotation tank/cell in place of the water or wastewater or liquid to be treated, 1, with the precoat added to the clean feed water which is then extracted through the membranes via the vacuum pump, 12.

To ensure proper hydraulic vectors and to match the rise rate and settling rate of the solids being separated the membrane modules, 20, are desirably separated by a minimum of 100 mm. A typical connection system between modules would be a male-female connector, 21A, 21B. To ensure high flux rates, the membrane pore size opening is not less than 1 micron and the hollow fibre membranes 23 have a diameter "x" which is not less than 6 millimeters. The spacing "y" between the hollow fibre membranes 23 shall be not less than two times "x". In the case where membrane sheets, 25, are used, the spacing between membrane sheets shall not be less than 50 mm. Spacing between membranes is important to allow solids to move freely to the surface or the bottom of the flotation tank/cell.

Figure 1:
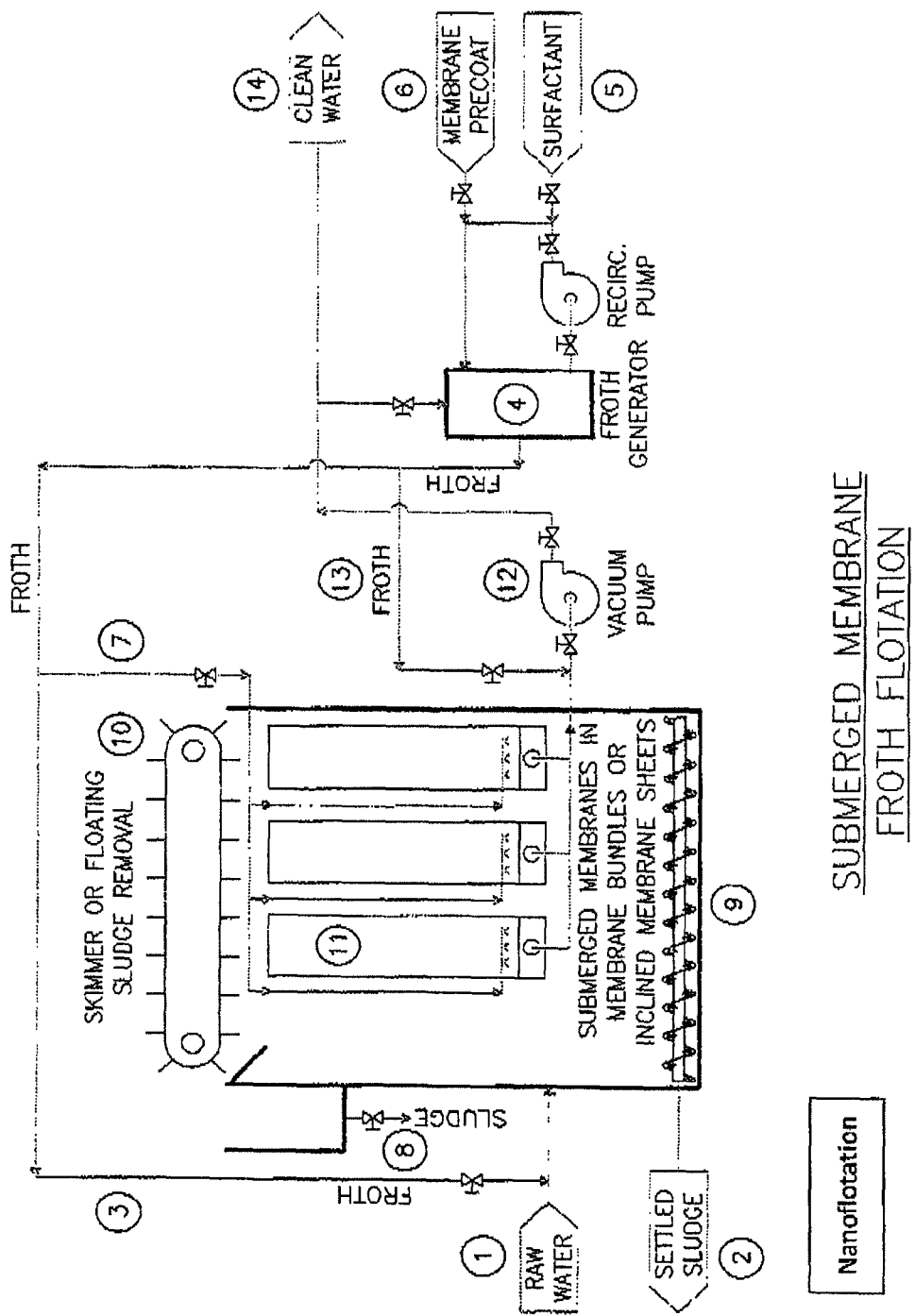
FIG. 1 shows an overall schematic of an embodiment of the invention which includes the flotation tank/cell, skimmer, submerged membranes, froth generator, and sludge removal system.
Figure 2:
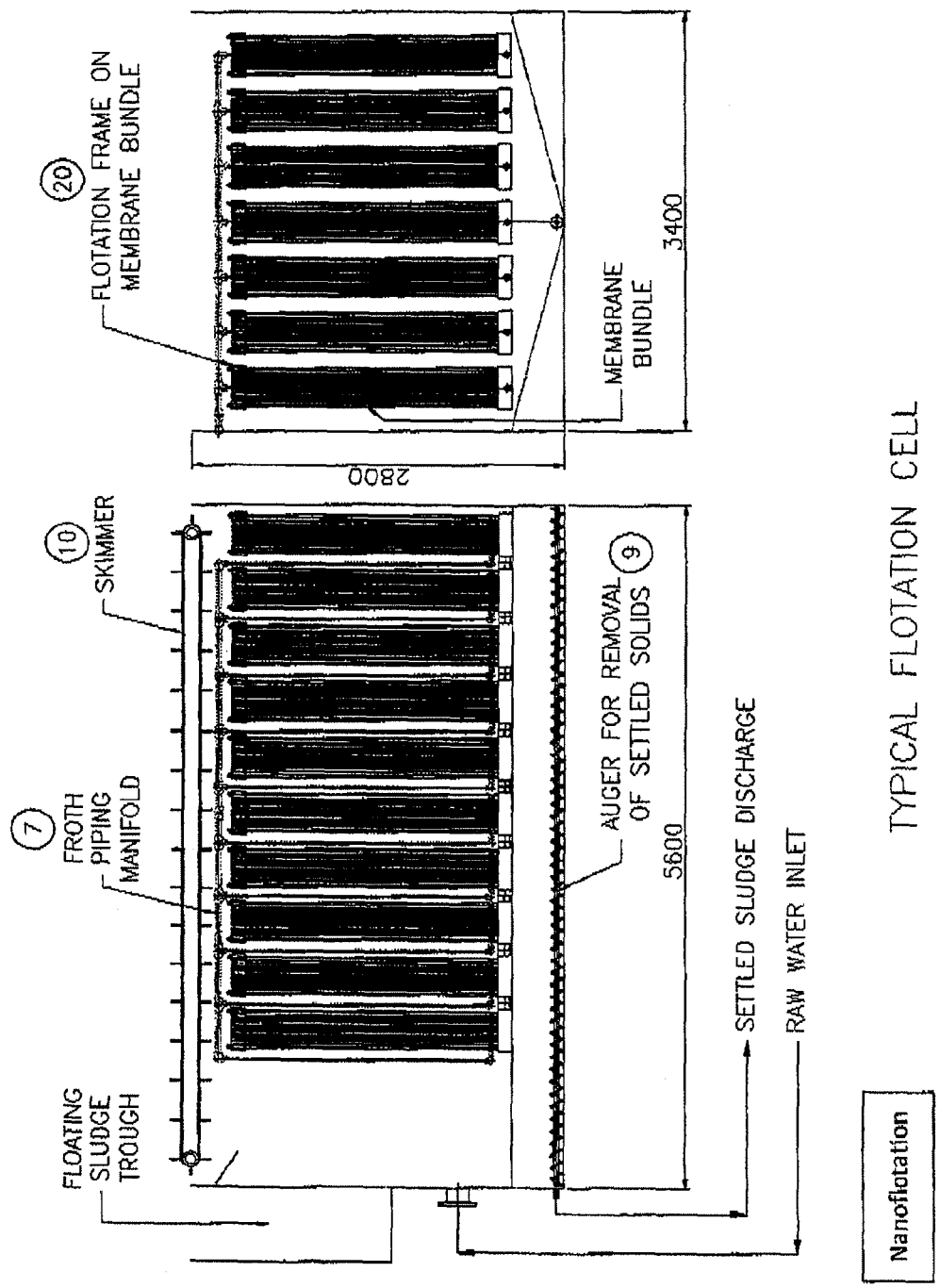
FIG. 2 shows the typical membrane bundles and the skimmer in the flotation cell/tank.
Figure 3:
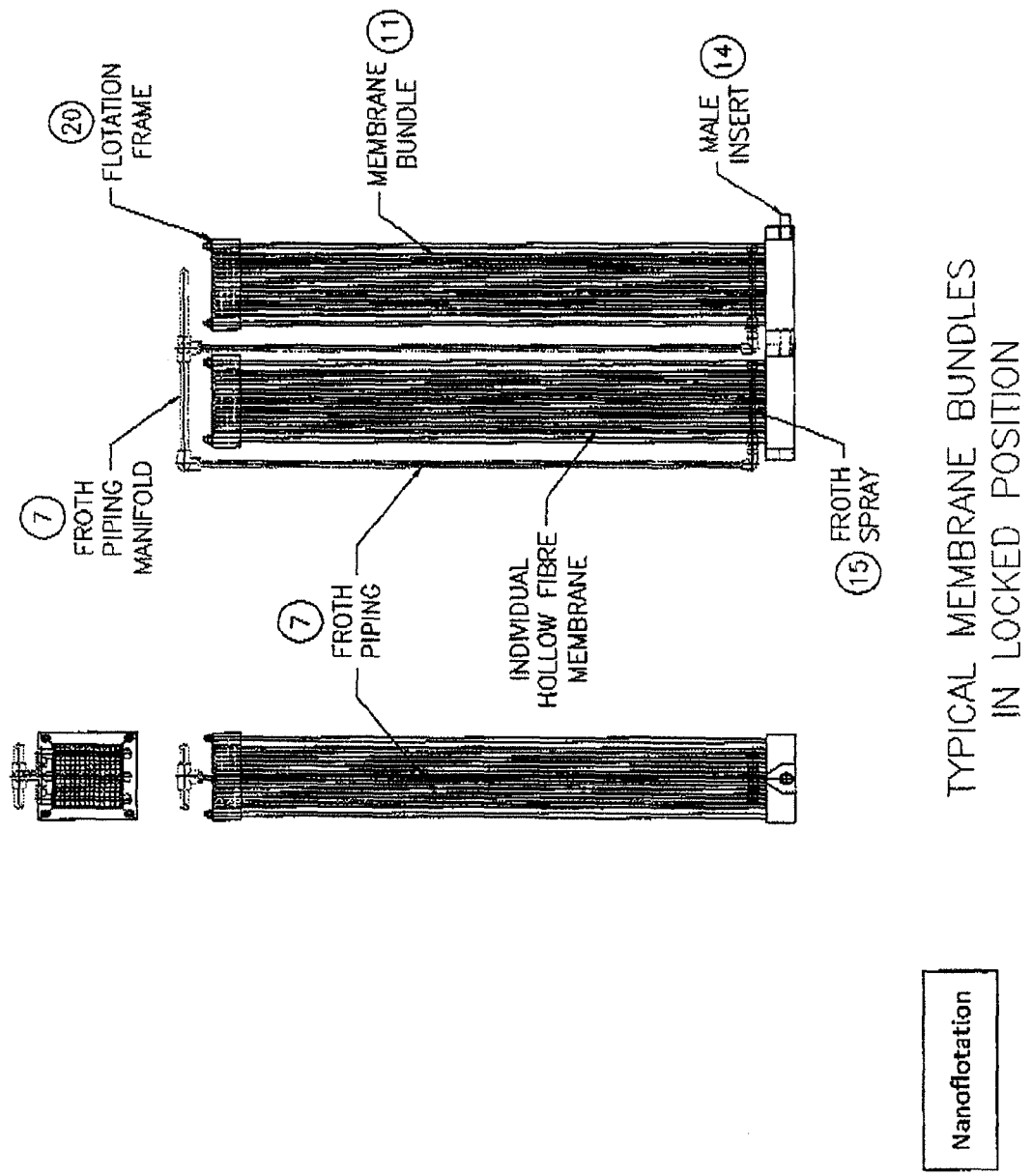
FIG. 3 shows the typical piping for the froth flotation system and the stacking of the membrane bundles.
Figure 4:
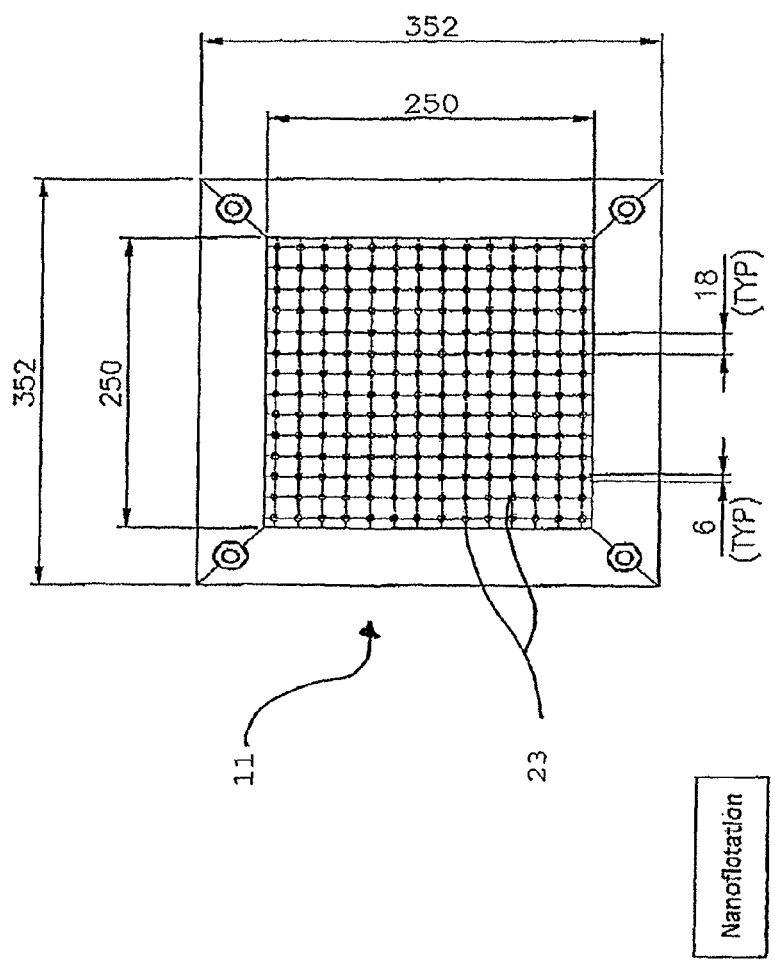
FIG. 4 shows typical hollow fibre spacing where all dimensions are typical and are in millimeters. Dimensions may vary.
Figure 5:
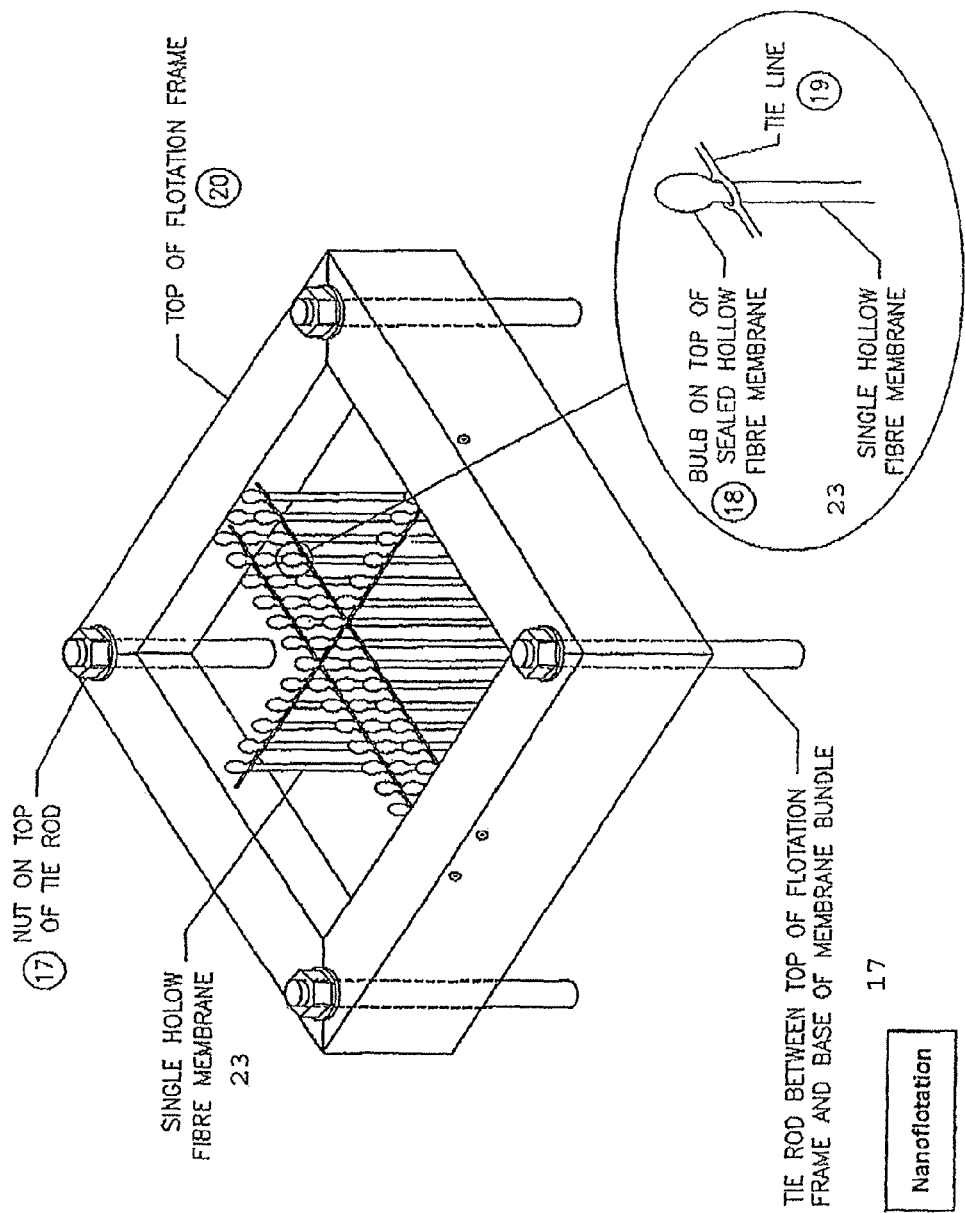
FIG. 5 shows a possible design for the top of the membrane bundle with a flotation frame.
Figure 6:
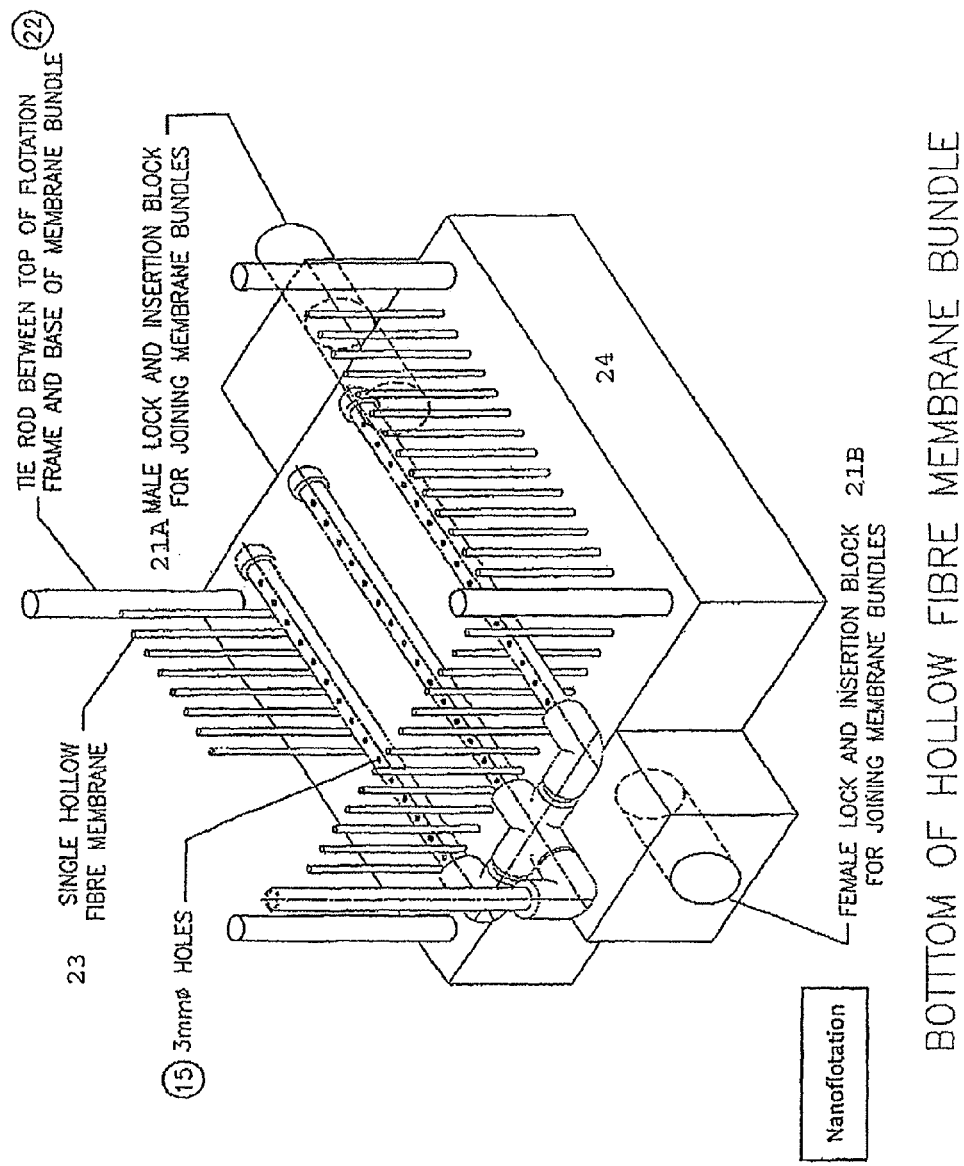
FIG. 6 shows a possible design for the bottom of the membrane bundle.

A possible design for the membrane module 11 which is part of one embodiment of this invention is provided in the figures. The design of the membrane modules 11 may be different than as shown in the figures. One aspect of the design shown in the illustrated embodiment of the invention is to minimize the hollow fibre membranes retention frames around the membrane module so that sludge and fibres and hair do not become entangled with the supporting membrane module frame. The suggested design for the membrane module 11 includes a base structure, 24, where the hollow fibre membranes 23 are potted into the base 24. The base, 24, has a cavity (not shown) from which the filtered water is sucked under vacuum by the vacuum pump, 12. The hollow fibre membranes 23 penetrate through the top of the base, 24, and into the cavity to allow the suction to draw water or liquid through the outside of the hollow fibre membranes 23 into the center of the hollow fibre membranes 23 and then into the cavity. The top of each hollow fibre membrane 23 is sealed, 18. Between the hollow fibre membranes, 23, are the froth distribution laterals, 15. At the top of the membrane module 11 is a flotation frame, 20, and tie rods, 17 that hold the top flotation frame, 20 and the bottom frame, 24 together with the flotation frame, creating an extra buoyancy to assist in keeping the hollow fibre membranes extended vertically. Tie lines, 19, may be used, as shown in FIG. 5, to ensure a grid structure of the hollow fibre membranes, 16.

Some aspects of the invention provide:
1. A solid separation system that uses submerged membranes precoated with particles added to the water, wastewater or liquid to be treated or is already a component of the water, wastewater or liquid to be treated and a charged or non-charged froth flotation to increase the upward vector velocity for particles or solids to be separated in water, wastewater or any liquid. The froth is produced through the use of low pressure (approximately 4 bar) froth flotation using an anionic or cationic or non-ionic surfactants or any other agent that will cause a froth to occur, which is mixed with water. The electronic charge from the surfactant on the air bubble in the froth is used to cause a rejection or attraction to the solids that coat the membrane such that the flux on the membrane is increased and the maintenance requirements are reduced. The operation of some embodiments of the invention has three cycles; the filtration cycle, the backwash cycle and the precoat cycle where the back wash and precoat cycle can be used independently or together as required.
2. A solid separation system according to aspect 1 where the water or liquid is drawn through the outside of a hollow fibre or tubular membrane to the inside. The lower horizontal or downward vector velocity for the solids or particles towards the submerged membrane referred to in aspect 1 will be created through the use of charge repulsion caused by pre-coated particles on the membrane which occur naturally as a result of the water or waste water liquid being treated or added prior to the treatment of water or waste water or liquid being treated by using charged small particles such as powder activated carbon or metal oxides.
3. The solid separation system of aspect 1, wherein the precoat is created using charged particles such as powder activated carbon or metal oxides where the particles to be separated are surface attached or entrapped in the precoat but the water or liquid is allowed to flow through the precoat and through the membrane.
4. Embodiments of the invention encourage the flow of water or liquid horizontally through a precoat on the membrane surface where the membranes in aspect 1 will be submerged in a vertical orientation and will be hollow fibre or tubular in structure using pore sizes 1 micron or greater and diameters greater than 5 mm.
5. The froth referred to in aspect 1 is added to the base of the membranes on a continuous or intermittent basis during the filtration operation and in some cases during the back washing operation and the precoat operation to allow the solids to be separated to float to the surface, to manage the addition or removal of the precoat when desired and to prepare the surface of the membrane for further precoats and filtration when desired.
6. The membranes referred to in aspect 1 are orientated in a rectangular pattern or square pattern and the membranes are spaced where the distance between the membranes will be at least 2 times the diameter of the hollow fibre membrane. The membrane modules will be spaced a minimum of 100 mm from each other. The membrane spacing and the membrane module spacing is important to allow for the rejected particles to float to the surface or settle to the bottom of the flotation tank or cell.
7. The membranes referred to in aspect 1 can be supported vertically by a cage that allows the membranes to vibrate and move where the membranes will be potted on the bottom in a housing but loose at the top. The top of the membranes will be individually sealed and the cage support and membrane support is designed to minimize the entrapment of fibres and hair.
8. The membranes of aspect 1 may be used to support a precoat where a vacuum will draw the water through the precoat and the membrane from the outside to the inside.
9. An alternative to the membrane modules of aspect 6 will be membrane sheets placed at an incline like inclined settling plates in clarifiers or placed vertically where the spacing is a minimum of 50 millimeters. The membrane sheet spacing is important to allow for the rejected particles to float to the surface or settle to the bottom of the flotation tank or cell.
10. The froth referred to in aspect 1 is also added as the back flushing or back pulsing on the membrane from the inside of the hollow fibre or tubular membrane to the outside. Backwash also includes the addition of air or water in combination with each other or in combination with the froth or independently of each other.

11. The froth referred to in aspect 1 may be added to the feed of the water or waste water or liquid entering the membrane chamber referred to herein where the froth in the water or waste water or liquid to be treated causes an upward velocity vector on the particles or solids to be separated in the flotation tank or cell.

What is claimed is:

1. A system for liquid treatment comprising:
   a membrane screen submerged in a liquid; and
   a charged granular precoat media introduced into the liquid and drawn to a surface of the membrane screen by a pressure differential to form a layer of the charged granular precoat media supported by the membrane screen; wherein:
   the liquid is drawn through the membrane screen and through the charged granular precoat media on the surface thereof by the pressure differential, whereby the charged granular precoat media removes suspended solids from the liquid by separating the suspended solids from the liquid through charge interactions with the charged granular precoat media;
   the charge interactions comprise repulsion of the suspended solids, which are removed from the liquid, from the charged granular precoat media on the surface of the membrane screen;
   the charged granular precoat media removes the suspended solids from the liquid via surface attachment of the suspended solids to the charged granular precoat media via the charge interactions, wherein the surface attachment takes place in the charged granular precoat media on the surface of the membrane screen; and
   wherein the membrane screen comprises a porous screen comprising a plurality of pores, the pores having dimensions greater than a dimension of at least some of the suspended solids removed from the liquid by the charged granular precoat media via surface attachment of the at least some of the suspended solids to the charged granular precoat media via the charge interactions.

2. A system for liquid filtration comprising:
   a tank;
   a plurality of membrane modules located within the tank and submerged in a liquid, wherein at least two adjacent membrane modules from among the plurality of membrane modules are spaced apart by at least 100 mm, each of the plurality of membrane modules comprising a plurality of membrane screens spaced apart by at least 12 mm, each of the plurality of membrane screens comprising:
      a hollow tube having a diameter of greater than 5 mm; and
      a sealed end;
   a vacuum pump coupled in fluid communication with the tank and at least one of the membrane screens to create a pressure differential and to remove a treated liquid from the tank;
   a charged granular precoat media introduced into the tank and drawn to a surface of the membrane screens by the pressure differential, whereby the charged granular precoat media removes the suspended solids from the liquid by separating the suspended solids from the liquid through charge interactions with the charged granular precoat media;
   a froth generator coupled in fluid communication with the tank for creating a froth introduced into the tank; and
   a backwash pump coupled in fluid communication with the tank for pumping a backwash liquid into the tank and into the hollow tubes of the membrane screens for removing the charged granular precoat media from the surface of the membrane screens; wherein:
   the charge interactions comprise repulsion of at least some of the suspended solids, which are removed from the liquid, from the charged granular precoat media on the surface of the membrane screen; and
   the charged granular precoat media removes the suspended solids from the liquid via surface attachment of the suspended solids to the charged granular precoat media via the charge interactions, wherein the surface attachment takes place in the charged granular precoat media on the surface of the membrane screen; and
   each membrane screen comprises a porous screen comprising a plurality of pores, the pores having dimensions greater than a dimension of at least some of the suspended solids removed from the liquid by the charged granular precoat media via surface attachment of the at least some of the suspended solids to the charged granular precoat media via the charge interactions.

3. A method of liquid filtration, the method comprising:
   a) introducing a charged granular precoat media into a liquid;
   b) drawing the charged granular precoat media to a surface of a membrane screen by way of a pressure differential to form a layer of the charged granular precoat media supported by the membrane screen; and
   c) filtering the liquid through the charged granular precoat media on the surface of the membrane screen;
   wherein filtering the liquid comprises removing, by the charged granular precoat media, suspended solids from the liquid by separating the suspended solids from the liquid through charge interactions with the charged granular precoat media;
   wherein separating the suspended solids from the liquid through charge interactions with the charged granular precoat media comprises:
      repulsing, through the charge interactions, the suspended solids, which are removed from the liquid, from the charged granular precoat media on the surface of the membrane screen; and
      removing, by the charged granular precoat media, the suspended solids from the liquid via surface attachment of the suspended solids to the charged granular precoat media via the charged interactions, wherein the surface attachment takes place in the charged granular precoat media on the surface of the membrane screen.

4. A method according to claim 3 comprising:
   d) removing the charged granular precoat media from the surface of the membrane screen by way of an opposed pressure differential opposed to the pressure differential; and
   e) creating a froth and introducing the froth into the liquid to be treated;
   wherein introducing the froth comprises creating a crossflow from the flow created by the pressure differential at the surface of the membrane screen to reduce clogging and buildup of the suspended solids at the surface of the charged granular precoat media.

5. A method according to claim 3 comprising, while filtering the liquid to be treated, introducing additional charged granular precoat media into the liquid to be treated and drawing the additional charged granular precoat media toward the membrane screen by way of the pressure differential.

6. A method according to claim 3 wherein the membrane screen comprises a porous screen comprising a plurality of pores, the pores having dimensions greater than a dimension of at least some of the suspended solids removed from the liquid by the charged granular precoat media.

7. A method according to claim 3 wherein the at least some of the suspended solids which are removed from the liquid and which are repulsed from the charged granular precoat media on the surface of the membrane screen are brought into proximity of the charged granular precoat media on the surface of the membrane screen by a pressure gradient that overcomes forces associated with the repulsing.

8. A method according to claim 3 wherein the membrane screen comprises a hollow tube and the method comprises drawing the liquid from an exterior of the hollow tube, through the charged granular precoat media in which the suspended solids are removed from the liquid, and into a bore of the hollow tube by the pressure differential.

9. A method according to claim 8 wherein the hollow tube is sealed at a first end and the liquid is drawn through the bore to a second end opposing the first sealed end.

10. A method according to claim 8 comprising: providing a plurality of membrane screens arranged in a membrane module; and, within the membrane module, spacing adjacent membrane screens from among the plurality of membrane screens apart by at least twice the diameter of each of the membrane screens.

11. A method according to claim 8 comprising:
providing a plurality of membrane screens; and
coupling the membrane screens to a housing wherein coupling the membrane screens to the housing comprises:
receiving a base of each of the membrane screens on a base of the housing; and
coupling an upper support to a top of each of the membrane screens to permit vibration of the membrane screens.

12. A method according to claim 11 wherein the upper support comprises a plurality of tie lines forming a grid, each tie line comprising openings and wherein the method comprises projecting the tubular membrane screens through the openings.

13. A method according to claim 3 wherein the charged granular precoat media comprises powder-activated carbon.

14. A method according to claim 3 wherein the charged granular precoat media comprises metal atoms.

15. A method according to claim 3 wherein the charged granular precoat media comprises a metal oxide.

16. A method according to claim 3 comprising: providing a plurality of membrane screens arranged in a membrane module; and, within the membrane module, spacing adjacent membrane screens from among the plurality of membrane screens apart by at least 12 mm.

17. A method according to claim 3 comprising creating the pressure differential using a vacuum pump coupled in fluid communication with a downstream side of the membrane screen.

18. A method according to claim 17 comprising creating a froth directed toward an upstream side of the membrane screen for assisting with the removal of the suspended solids from the liquid using a froth generator coupled in fluid communication with an upstream side of the membrane screen.

19. A method according to claim 18 comprising introducing the froth on the upstream side of the membrane screen in an upward direction to create a crossflow vector to thereby reduce clogging and buildup of the suspended solids on the layer of the charged granular media.

20. A method according to claim 17 comprising providing a backwash mode, wherein providing the backwash mode comprises: deactivating the vacuum pump and pumping a backwash liquid from the downstream side of the membrane screen to an upstream side of the membrane screen to thereby remove the charged granular precoat media from the surface of the membrane screen using a backwash pump coupled in fluid communication with the downstream side of the membrane screen.

21. A method according to claim 20 wherein the backwash liquid comprises a treated liquid.

22. A method according to claim 21 comprising creating a froth using a froth generator and, as part of the backwash mode, pumping the froth into the liquid on the upstream side of the membrane screen.

23. A method according to claim 22 wherein the backwash liquid comprises the froth.

24. A method according to claim 20 wherein the backwash liquid comprises air.

25. A method according to claim 18 wherein the froth comprises a surfactant.

26. A method according to claim 25 wherein the surfactant is one of a cationic and anionic surfactant for creating a charged air bubble in the froth and the charge on the charged air bubble is imparted onto the charged granular precoat media to thereby provide charge to the charged granular precoat media.

27. A method according to claim 25 wherein the surfactant is non-ionic.

28. A method according to claim 3 comprising providing a plurality of membrane modules each comprising a plurality of membrane screens, and spacing at least two adjacent membrane modules from among the plurality of membrane modules apart by at least 100 mm.

29. A method according to claim 3 wherein the membrane screen comprises a plurality of planar membrane sheets and the method comprises orienting the membrane sheets at an incline from vertical and spacing at least two adjacent membrane sheets from among the plurality of membrane sheets apart by at least 50 mm.

30. A method according to claim 3 wherein the membrane screen comprises a porous screen comprising a plurality of pores, the pores having dimensions of 1 micron or greater and at least some of the suspended solids removed from the liquid by the charged granular precoat media have dimensions less than 1 micron.

\* \* \* \* \*